(12) United States Patent  
Rouhana

(10) Patent No.: US 9,090,225 B2
(45) Date of Patent: Jul. 28, 2015

(54) SHOULDER BELT LATCH LOAD-LIMITING SYSTEM

(71) Applicant: Ford Global Technologies, LLC, Dearborn, MI (US)

(72) Inventor: Stephen William Rouhana, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/958,297

(22) Filed: Aug. 2, 2013

(65) Prior Publication Data

US 2015/0035265 A1    Feb. 5, 2015

(51) Int. Cl.
*B60R 22/28* (2006.01)
*B60R 21/055* (2006.01)

(52) U.S. Cl.
CPC .............. *B60R 22/28* (2013.01); *B60R 21/055* (2013.01)

(58) Field of Classification Search
USPC ........ 280/801.1, 805, 808; 180/268; 297/468, 297/471
See application file for complete search history.

(56) References Cited

U.S. PATENT DOCUMENTS

| | | | | |
|---|---|---|---|---|
| 3,456,981 | A * | 7/1969 | Booth et al. | 297/472 |
| 4,567,629 | A * | 2/1986 | Tanaka | 24/653 |
| 5,971,489 | A * | 10/1999 | Smithson et al. | 297/472 |
| 6,056,320 | A * | 5/2000 | Khalifa et al. | 280/805 |
| 6,099,078 | A * | 8/2000 | Smithson et al. | 297/472 |
| 6,558,027 | B2 | 5/2003 | Ellis et al. | |
| 6,634,064 | B2 * | 10/2003 | Finotti | 24/198 |
| 6,666,519 | B2 * | 12/2003 | Palliser et al. | 297/483 |
| 6,729,428 | B2 * | 5/2004 | Jitsui | 180/268 |
| 7,232,155 | B2 | 6/2007 | Nishizawa | |
| 7,716,795 | B2 * | 5/2010 | Versellie et al. | 24/593.1 |
| 7,996,964 | B2 * | 8/2011 | Wendt et al. | 24/593.1 |
| 2010/0109215 | A1 * | 5/2010 | Ruthinowski et al. | 267/140.13 |
| 2010/0109395 | A1 * | 5/2010 | Ruthinowski et al. | 297/216.11 |
| 2012/0126597 | A1 * | 5/2012 | Hall et al. | 297/250.1 |
| 2012/0198660 | A1 * | 8/2012 | Richter et al. | 24/170 |
| 2013/0062925 | A1 * | 3/2013 | Hori | 297/468 |

FOREIGN PATENT DOCUMENTS

CA    2447580    5/2006
EP    1273243    8/2003

* cited by examiner

*Primary Examiner* — Paul N Dickson
*Assistant Examiner* — Darlene P Condra
(74) *Attorney, Agent, or Firm* — LeClairRyan

(57) ABSTRACT

A seat belt arrangement includes a vehicle floor, a seat, and a latch assembly including a deformable element. Shoulder and lap belt webbings are attached to the latch assembly. The shoulder belt webbing is associated with the deformable element. According to one embodiment, the latch assembly includes a latch plate to which the shoulder belt webbing is attached at an attachment point. This point includes the deformable element that may be a deformable pin or an insert fitted to the latch plate, or may be a relatively soft material. Alternatively, the latch assembly includes a movable element and a fixed element having a deformable element fitted there between. When deformed, the deformable element allows movement of the movable element toward the fixed element, thereby limiting the forces of an impact applied by the shoulder belt to the lower portion of the chest of a vehicle occupant wearing the disclosed belt system.

7 Claims, 4 Drawing Sheets

SHOULDER BELT LATCH LOAD-LIMITING SYSTEM

TECHNICAL FIELD

The disclosed inventive concept relates generally to seat belts for vehicle seats. More particularly, the disclosed invention relates to a system for limiting the load on the lower portion of a vehicle occupant's chest during an impact event while wearing a three-point seat belt.

BACKGROUND OF THE INVENTION

Automotive vehicles incorporate a variety of restraint systems to provide for the safety of vehicle occupants. For example, it is known in the vehicle art to provide various types of seat belts or restraint systems for restraining an occupant in his or her seat and providing controlled deceleration of portions of the body to limit the forces applied to the occupant's body during rapid deceleration of a vehicle from a cause such as a collision. Various types of seat belts and restraint systems have been used in automobiles, trucks, and other vehicles and are commonly known today.

Known seat belt systems typically used in commercially available production vehicles are three-point restraint systems with a lap belt and a shoulder belt extending over one shoulder of the occupant and connecting with the lap belt. The lap belts are anchored at one end, to the seat or to the vehicle body at a point adjacent the seat. The shoulder belts are connected at one end to the vehicle or to the seat and at the other end to the lap belt or lap belt buckle mechanism.

A challenge faced by designers of known seat belt systems is to provide a load limiter. Limiting the load on the seat occupant may be a desirable approach to reducing injury. To this end systems for limiting the load on the upper portion of the shoulder belt and thus on the upper portion of the vehicle occupant's chest are known and are incorporated into a seat belt retractor or in the structure to which the seat belt retractor is mounted. According to known approaches, the shoulder belt load limiter-fitted retractor is typically mounted above and behind the occupant's shoulder. Such systems have demonstrated a reduction of load on the upper portion of the wearer's chest in an impact event.

However, during an impact event such known systems are not particularly effective at limiting the load on the lower portion of the seat belt, or, more importantly, to the lower portion of the seated occupants chest, where, in general, the lower portion of the shoulder belt meets the latch plate and, either in addition or in the alternative, the lap belt. This is because during the impact event the friction between the shoulder belt and the upper torso greatly reduces the effect of load-limiting on the lower torso. It may be too that lower chest shoulder belt forces actually contribute to chest deflection.

An alternative to the known arrangement is to make the lap belt anchor or lap belt buckle attachment itself load-limiting. While tending to reduce the lower torso-applied loads, this arrangement may also allow more pelvis excursion which would tend to raise the loads applied to the lower torso.

As in so many areas of vehicle technology there is always room for improvement related to the use and operation of vehicle seat belt systems.

SUMMARY OF THE INVENTION

The disclosed inventive concept provides a seat and seat belt arrangement for a vehicle that provides additional benefits compared to known load limiting systems. The disclosed inventive concept includes a vehicle floor, a seat attached to the floor, and a latch assembly that includes a deformable element. A latch plate assembly anchor or buckle assembly is attached to either the floor or to the seat.

A shoulder belt is attached to the latch assembly. The shoulder belt is operatively associated with the deformable element. A lap belt is also attached to the latch assembly.

According to one embodiment of the disclosed inventive concept, the latch assembly includes a latch plate. The shoulder belt is attached to the latch plate at an attachment point. The attachment point includes the deformable element. According to this embodiment of the disclosed inventive concept, the deformable element may be a deformable pin fitted to the latch plate, an insert fitted to the latch plate, or a material that is softer than the adjacent material.

According to another embodiment of the disclosed inventive concept the latch assembly includes a movable element and a fixed element. The movable element is movable relative to the fixed element. Disposed between the movable and fixed elements is a deformable element which, when deformed, allows movement of the movable element toward the fixed element. In this embodiment the shoulder belt and the lap belt are a single belt, a portion of which loops at least partially around the movable element.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
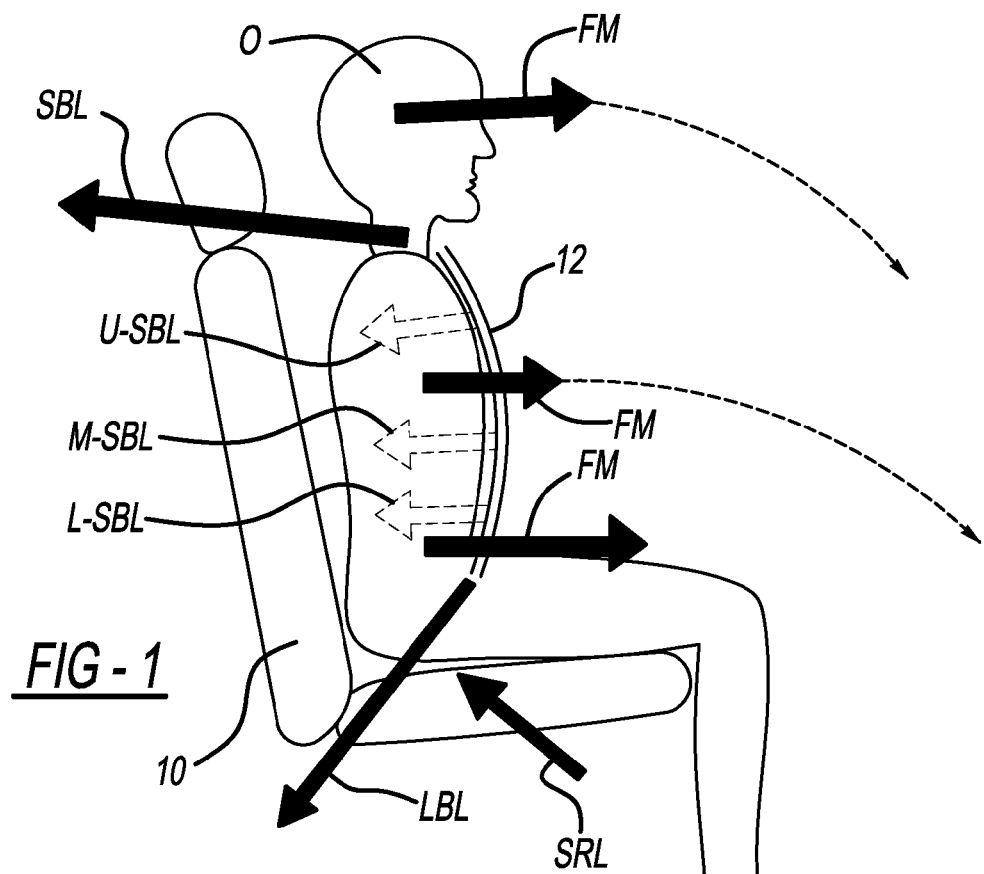
FIG. 1 illustrates a diagrammatic side view of an occupant positioned in a vehicle seat with the primary forces acting on the occupant during an impact event.

In the following figures, the same reference numerals will be used to refer to the same components. In the following description, various operating parameters and components are described for different constructed embodiments. These specific parameters and components are included as examples and are not meant to be limiting.

During an impact event the seated occupant of a vehicle seat experiences several forces. The primary forces acting on the seat occupant during an impact event are illustrated in FIG. 1 in which a diagrammatic side view of the occupant is shown. The occupant "O" is seated in a vehicle seat 10 wearing a shoulder belt webbing 12. In a typical front impact, as the vehicle is slowed or stoped, the occupant "O" continues to move forward due to his own momentum as illustrated by the three forward pointing arrows "FM."

Meanwhile, assuming the occupant "O" is wearing the factory-provided 3-point seat belt during the impact, a variety of loads are experienced, including a shoulder belt load "SBL," a lap belt load "LBL," and a seat reaction load "SRL," and a floor pan load "FPL." The SBL can be further separated into upper "U-SBL," middle "M-SBL," and lower "L-SBL" shoulder belt loads. Known load limiters incorporated into the shoulder belt retractor provide some relief to these loads, but mostly to the U-SBL. This happens because, as is known, friction between the occupant's chest and the shoulder belt reduces the effectiveness of these load-limiters on the occupant's lower chest. In fact, studies reveal that lower chest shoulder belt forces actually may contribute to chest deflection.

In general, the disclosed invention provides a method and apparatus for limiting the load on the lower portion of a vehicle seat occupant's chest during an impact event while wearing a 3-point seat belt. The disclosed inventive concept overcomes the issue of some known 3-point seat belt load limiting systems in which the friction between the belt and the occupant's chest reduces the effectiveness of load limiting at the lower chest in the area where the lower portion of the shoulder belt meets the latch plate or the lap belt or both.

By providing a load-limiter on the shoulder belt side of the lap-shoulder belt junction as disclosed the limitations of known load limiting systems for seat belts are overcome, thereby achieving enhanced load limiting of the lower chest. Particularly, the disclosed inventive concept allows the occupant's lower chest to experience lower force from the shoulder belt and allows the lap belt to firmly hold the occupant's chest, thus demonstrating no increased pelvis displacement and no decreased pelvis load.

Figure 6:
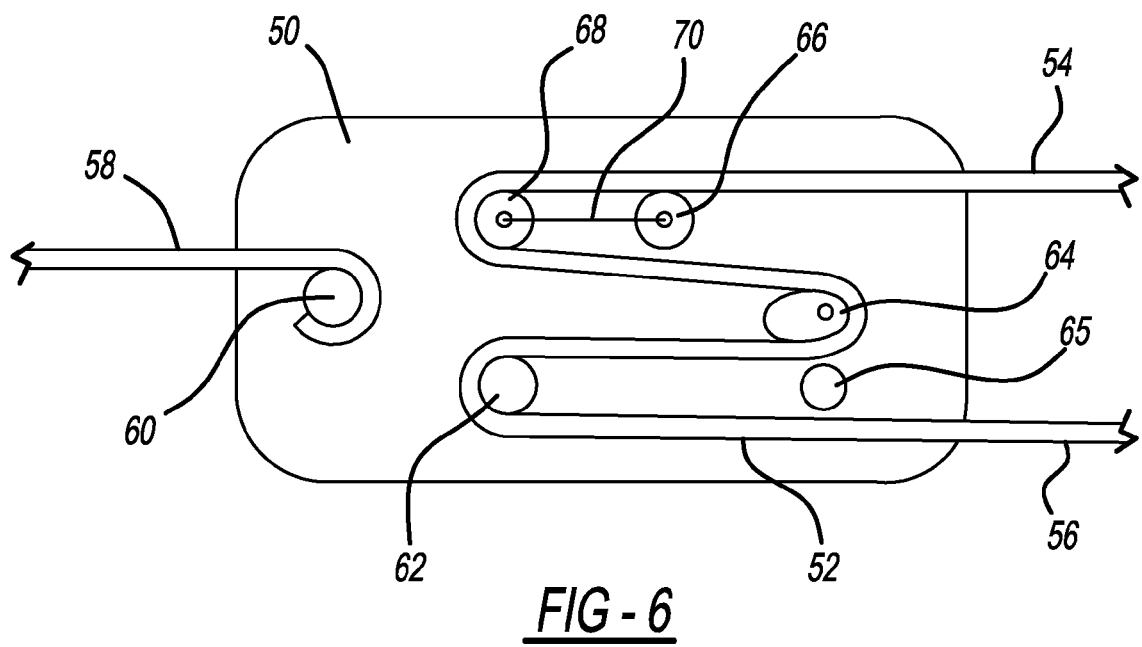
FIG. 6 is a view of a seat belt system incorporating an energy absorbing element shown before an impact event.
Figure 7:
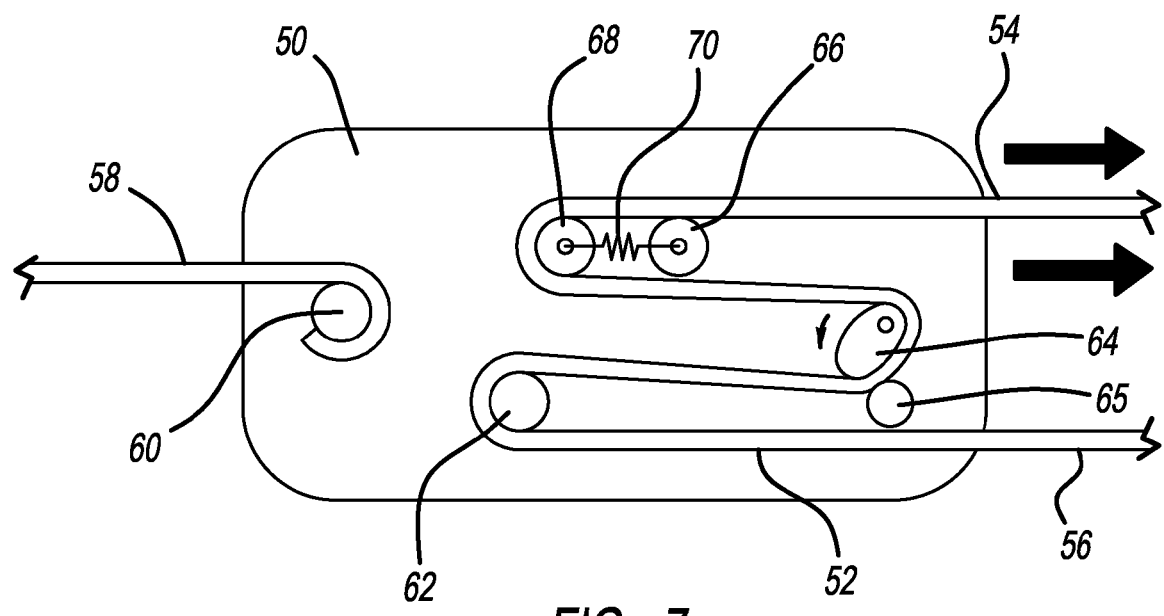
FIG. 7 is a view of the seat belt system of FIG. 6 incorporating an energy absorbing element shown after an impact event.

The disclosed inventive concept is expressed in two embodiments. The first embodiment, the "dual retractor" system, is illustrated in FIGS. 2 through 5 and is discussed in relation thereto. The second embodiment, the "single retractor" system, is illustrated in FIGS. 6 and 7 and is discussed in relation thereto.

Figure 2:
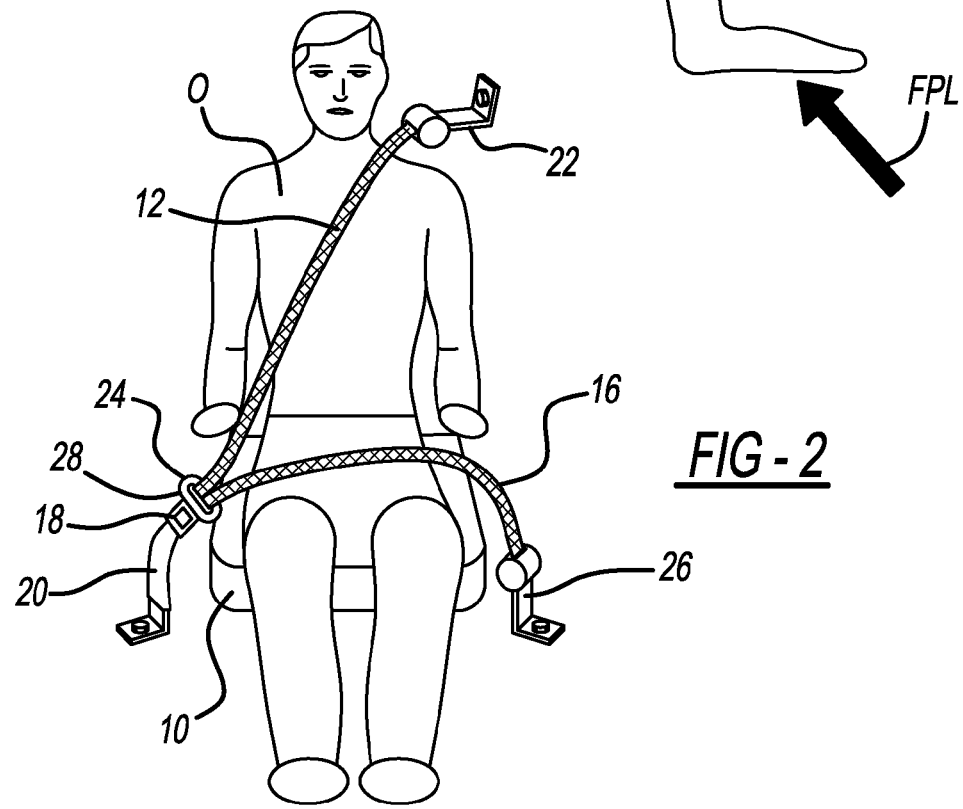
FIG. 2 illustrates a front view of an occupant positioned in a vehicle seat and wearing a seat belt system according to the disclosed inventive concept.

Referring to FIG. 2, a front view of an occupant "O" positioned in the vehicle seat 10 is illustrated. The occupant "O" is wearing a 3-point seat belt that comprises the shoulder belt webbing 12, a lap belt webbing 16, and a buckle 18 anchored to either the vehicle floor or to the vehicle seat by a stalk 20. The shoulder belt webbing 12 is attached at one end to a first retractor 22 that is anchored to an adjacent interior surface of the vehicle or to the vehicle seat 10. The other end of the shoulder belt webbing 12 is attached to a latch plate assembly 24.

The lap belt webbing 16 is attached at one end to a second retractor 26 that is anchored to either the vehicle floor or to the seat 10 as is known in the art. The other end of the lap belt webbing 16 is attached to the latch plate assembly 24.

The placements and configurations of the buckle 18, the stalk 20, the first retractor 22, and the second retractor 26 shown in FIGS. 2 through 5 are set forth for illustrative purposes only and are not intended as being limiting. Variations in the placement and configuration of these components may be made without deviating from the spirit and scope of the disclosed inventive concept.

According to the embodiment shown in FIGS. 2 through 5 and discussed in relation thereto, the latch plate assembly 24 includes a latch plate 28 to which one end of the shoulder belt webbing 12 and one end of the lap belt webbing 16 are attached. Three variations of the latch plate 28 are set forth below. These variations share in common a deformable component that provides the latch plate assembly 24 with a load limiting capacity to thereby provide the advantages to the seated occupant as discussed above.

Figure 3:
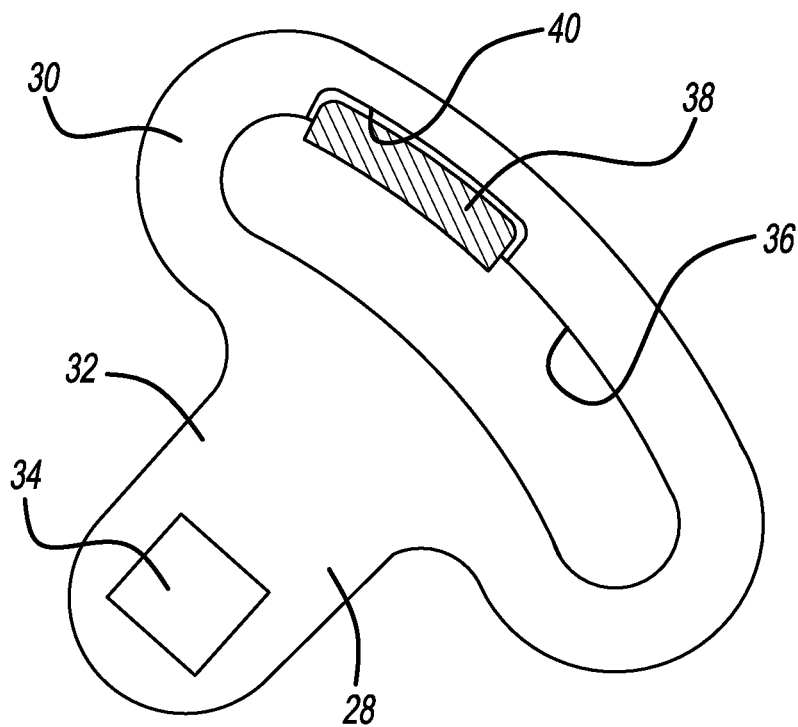
FIG. 3 is a view of a first embodiment of a latch plate having a deformable pin according to the disclosed inventive concept.

The first variation of the latch plate of the disclosed inventive concept is illustrated in FIG. 3. As disclosed therein, the latch plate 28 includes a body 30 having a tongue 32 in which a latch opening 34 is formed. The latch opening 34 is provided to receive the latching mechanism of the buckle 18 as is known in the art.

An arcuate loop or webbing guide 36 is defined in the body 30 of the latch plate 28. Both the shoulder belt webbing 12 and the lap belt webbing 16 are attached to the arcuate loop 36.

The shoulder belt webbing 12 is attached to or passes over a deformable pin 38 which deforms if a certain force is applied thereto by the seated occupant in an impact event. The deformable pin 38 is fitted into a cut out area 40 formed in a wall of the arcuate loop 36.

The deformable pin 38 may be composed of a relatively deformable material. This material is preferably a ductile material such as aluminum, copper or lead although it is to be understood that other materials may be used for this purpose. By "relatively deformable" it is meant that the deformable pin 38 is more readily deformed than the adjacent material of the body 30.

Figure 4:
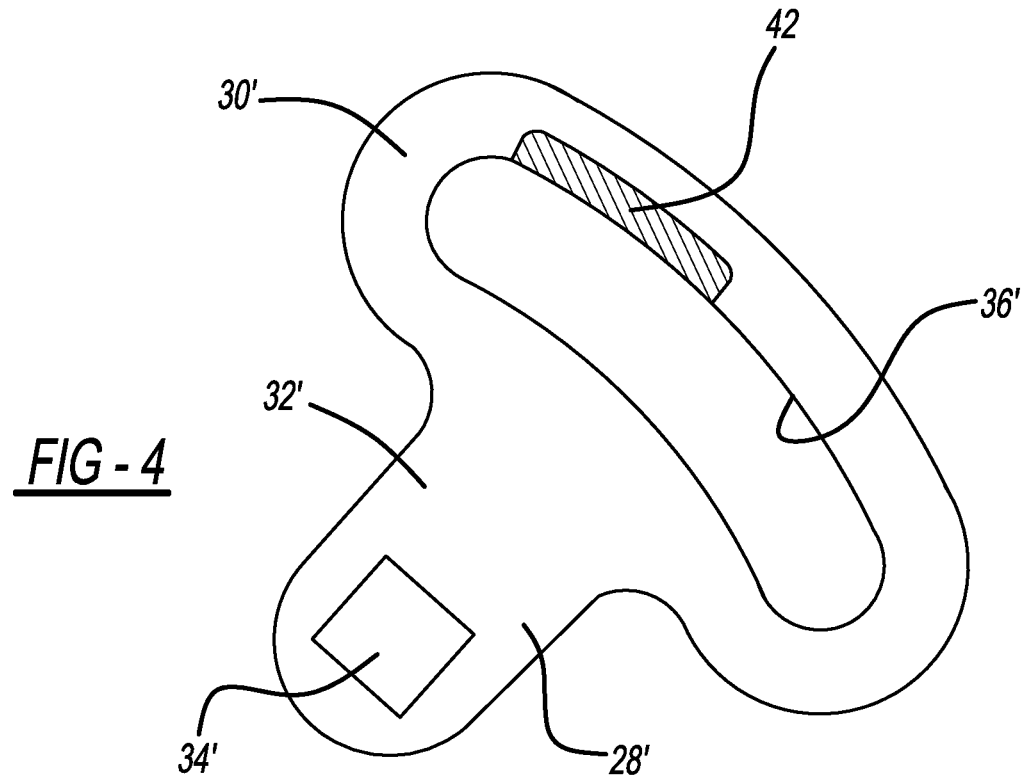
FIG. 4 is a view of a second embodiment of a latch plate having an area of deformable material according to the disclosed inventive concept.

The second variation of the latch plate of the disclosed inventive concept is illustrated in FIG. 4. A latch plate 28' is illustrated and a body 30' having a tongue 32' in which a latch opening 34' is formed. An arcuate loop or webbing guide 36' is defined in the body 30'. Both the shoulder belt webbing 12 and the lap belt webbing 16 are attached to the arcuate loop 36'.

The shoulder belt webbing 12 is attached to or passes over a deformable region 42 of the body 30'. The deformable region 42 deforms if a certain force is applied thereto by the seated occupant in an impact event. The deformable region 42 is integrally formed with the body 30' and is composed of a relatively deformable material, preferably a ductile metal such as aluminum, copper or lead. As with the deformable pin 38 described above, by "relatively deformable" it is meant that the deformable region 42 is more readily deformed than the adjacent material of the body 30'.

Figure 5:
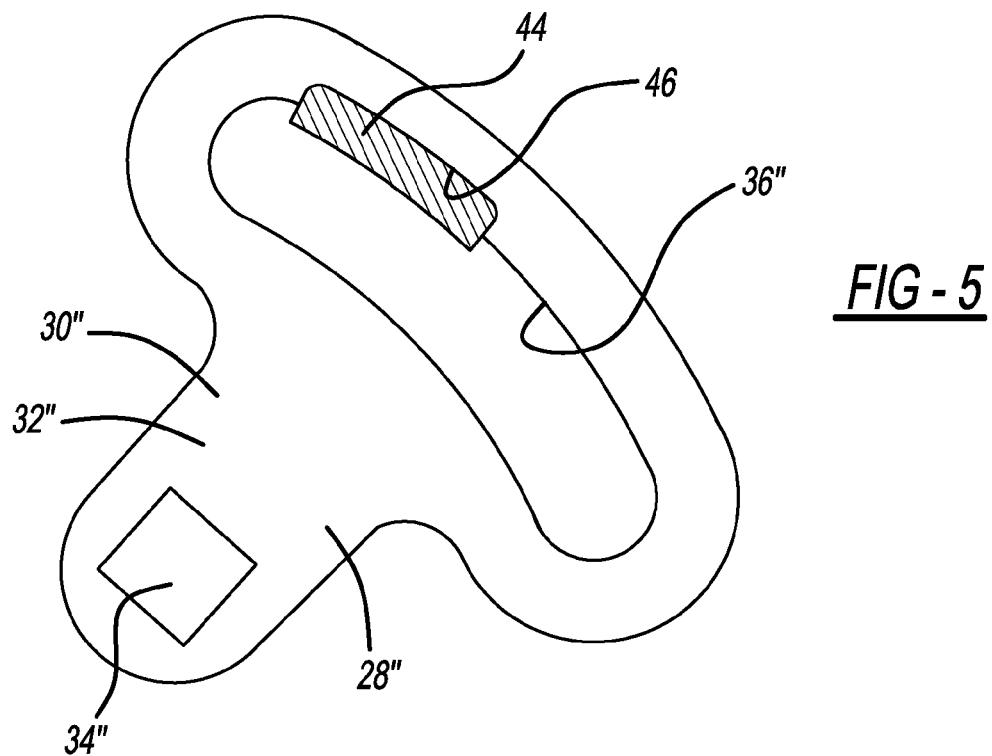
FIG. 5 is a view of a third embodiment of a latch plate having a deformable insert according to the disclosed inventive concept.

The third variation of the latch plate of the disclosed inventive concept is illustrated in FIG. 5. A latch plate 28" is illustrated and a body 30" having a tongue 32" in which a latch opening 34" is formed. An arcuate loop or webbing guide 36" is defined in the body 30". Both the shoulder belt webbing 12 and the lap belt webbing 16 are attached to the arcuate loop 36".

The shoulder belt webbing 12 is attached to or passes over a deformable insert 44 of the body 30". The deformable region 44 deforms if a certain force is applied thereto by the seated occupant in an impact event. The deformable insert 44 is fitted into a cut out area 46 formed in a wall of the arcuate loop 36" and is composed of a relatively deformable material, preferably a ductile metal such as aluminum, copper or lead. As with the deformable pin 38 and the deformable region 42 described above, by "relatively deformable" it is meant that the deformable insert 44 is more readily deformed than the adjacent material of the body 30".

While the first embodiment of the disclosed inventive concept is set forth in FIGS. 2 through 5 and is discussed in relation thereto, the second embodiment of the disclosed inventive concept, the "single retractor" system, is illustrated in FIGS. 6 and 7.

With reference to FIG. 6, a single retractor system incorporating an energy absorbing element is shown before an impact event. Particularly, a locking mechanism 50 is illustrated. A combination shoulder and lap belt webbing 52 is provided and includes a shoulder belt portion 54 and a lap belt portion 56. A latch belt 58 is provided for engagement with a buckle conventionally provided. The latch belt 58 is anchored to the locking mechanism by an anchoring device such as an anchoring pin 60.

The locking mechanism includes a first fixed pin 62, a locking cam 64, a cam stop 65, and a second fixed pin 66. A movable pin 68 is provided adjacent the third fixed pin 66. The combination shoulder and lap belt webbing 52 is wound partially around the first fixed pin 62, the locking cam 64, and the movable pin 68. The combination shoulder and lap belt webbing 52 rides along the second fixed pin 66.

Connecting the movable pin 68 and the second fixed pin 66 is a deformable element 70. The deformable element 70 may be composed of any deformable material such as a ductile metal.

The locking cam 64 is an optional feature that may be replaced by a third fixed pin. If replaced by a third fixed pin (not shown) then the antagonistic forces from the shoulder and lap belt webbing 52 could be enough to initiate deformation. However, when provided, the locking cam 64 functions to lock the shoulder and lap belt webbing 52 in place in an impact event prior to deformation of the deformable element 70.

In its pre-deformed position as illustrated in FIG. 6, the movable pin 68 is spaced apart from the second fixed pin 66. However, if an impact event is experienced, the locking cam 64 is caused to rotate on its pivot point in the direction of the arrow shown in FIG. 7. In such a situation, a portion of the webbing 52 is captured and locked between the locking cam 64 and the cam stop 65. The deformable element 70 thereafter yields to the force placed upon the shoulder belt portion 54 of the combination shoulder and lap belt webbing 52 by the movement of the occupant. However, this load is limited due to the deformation of the deformable element 70 as shown in FIG. 7. In such an event the load placed on the occupant's lower chest would accordingly be limited.

The disclosed invention as set forth above overcomes the challenges faced by known load limiting seat belt systems by either eliminating or significantly reducing the load placed on the lower chest area of an occupant in an impact event. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A seat and seat belt arrangement for a vehicle comprising:
 a vehicle floor;
 a seat attached to said floor;
 a latch assembly including a latch plate, said plate including a deformable pin;
 a shoulder belt attached to said latch assembly and associated with said pin;
 a lap belt attached to said latch plate at an attachment point; and
 a latch plate anchor to which said latch assembly releasably attaches.

2. The seat and seat belt arrangement of claim 1 wherein said deformable element is composed of a material that is softer than adjacent material.

3. The seat and seat belt arrangement of claim 1 wherein said deformable element is an insert fitted to said latch plate.

4. A seat belt arrangement for a vehicle comprising:
 a latch assembly including a latch plate, said plate including a deformable pin;
 a shoulder belt attached to said latch plate at an attachment point, said attachment point including said pin;
 a lap belt attached to said latch assembly; and
 a latch plate anchor to which said latch assembly releasably attaches.

5. The seat belt arrangement of claim 4 wherein said deformable element is composed of a material that is softer than adjacent material.

6. The seat belt arrangement of claim 4 wherein said deformable element is an insert fitted to said latch plate.

7. A load limiter for a seat belt arrangement for a vehicle, the arrangement including a shoulder belt, a lap belt, and a belt anchor, the load limiter comprising:
 a latch to which the shoulder and lap belts are attached, said latch including a latch plate;
 a deformable element operatively associated with the shoulder belt, said deformable element being a deformable pin, said deformable pin being attached to said latch plate.

* * * * *